United States Patent Office 3,190,899
Patented June 22, 1965

3,190,899
REACTION OF HALF ESTERS OF AN ALPHA, BETA - ETHYLENICALLY UNSATURATED - ALPHA,BETA - DICARBOXYLIC ACID WITH A VICINAL EPOXY COMPOUND AND PRODUCTS THEREOF
Henry W. Walton and Charles S. Nevin, both of Decatur, Ill., assignors to A. E. Staley Manufacturing Company, Decatur, Ill., a corporation of Delaware
No Drawing. Filed June 8, 1961, Ser. No. 126,394
22 Claims. (Cl. 260—404.8)

This invention relates to vicinal acryloxy-hydroxy long chain aliphatic compounds having a carboxyl group esterified with a monohydroxy compound on the beta carbon atom of the acryloxy group. These compounds are characterized by two structural features: (1) an aliphatic chain having from 10 to 24 carbon atoms, and (2) vicinal acryloxy and hydroxy groups on the aliphatic chain represented by the following formula

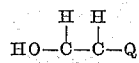

In the above formula, Q is an acryloxy group having on the beta carbon atom a carboxyl group esterified with a monohydroxy compound having no ethylenic unsaturation. These compounds are reaction products of a long-chain vicinal epoxy compound having on an average at least one epoxy group per molecule and a half-ester of an alpha,beta-ethylenically unsaturated alpha,beta-dicarboxylic acid (preferably maleic or fumaric).

Certain homopolymerizable vicinal acryloxy-hydroxy compounds are disclosed and claimed in application Serial No. 800,071, filed March 18, 1959. However, in the compounds of this invention the presence of a carboxy group esterified with a monohydroxy compound on the beta carbon atom of the acryloxy group, sterically hinders the reactivity of the ethylenic double bond in the acryloxy group in such a manner that the compound will not homopolymerize but nevertheless has the ability to copolymerize with vinylidene compounds such as styrene, methyl methacrylate, vinyl acetate, etc.

An important characteristic of the compounds of this invention is that their properties can be readily and inexpensively modified by changing the alcohol from which the half-ester of the alpha,beta-ethyleneically unsaturated alpha,beta-dicarboxylic acid is made. For example, when the half-ester is based on a lower alcohol, such as isopropanol, copolymerization products of the compounds of this invention with monomers such as styrene, are relatively more rigid than they are when the half-ester is based on a higher alcohol such as ethylhexanol. The flexibility of the copolymers increases as the number of carbon atoms in the alcohol increases. Generally, aryl half-esters form harder copolymerization products than the corresponding alkyl half-esters. On the other hand the compounds of Serial No. 800,071 can to some extent be modified by substituents on the alpha carbon atom of the acryloxy group. But the introduction of substituents other than methyl is so expensive that other modes of achieving the flexibility in characteristics must be sought.

Further, the beta carboxy ester substituted acryloxy-hydroxy compounds of this invention are generally not more expensive than any of the compounds of Serial No. 800,071. Products based on the isopropyl half-ester of fumaric and maleic acid have a decided cost advantage over any of the products of Serial No. 800,071.

In addition to the foregoing advantages in cost and in flexibility of choice of properties, the inability of the compounds of this invention to homopolymerize offers an additional advantage; it is unnecessary to use a polymerization inhibitor during the production of these compounds (e.g. reaction of the half-ester of an alpha,beta-ethylenically unsaturated - alpha,beta - dicarboxylic acid with a long-chain vicinal epoxy compound) or in their subsequent storage. This is a decided advantage, since the best polymerization inhibitors (e.g. phenolics) used in the reaction of acrylic compounds having terminal ethylenic unsaturation, with a long chain epoxidized material tend to impart color to the reaction product. It is, of course, understood that a good polymerization inhibitor is one which effectively prevents undesirable polymerization, but which can be readily overcome (has a low induction period) by the use of heat and/or polymerization catalyst. The selection of an inhibitor that does not discolor the reaction product but has the properties required by a good polymerization inhibitor, is difficult.

The object of this invention is the provision of novel vicinal acryloxy-hydroxy long-chain aliphatic compounds having a carboxyl group esterified with a monohydroxy compound on the beta carbon atom of the acryloxy group, which have utility in the preparation of useful resinous products by copolymerization with vinylidene compounds. Generally speaking, these are prepared by reaction between long-chain aliphatic epoxy compounds and half-esters of alpha,beta-ethylenically unsaturated alpha,beta-dicarboxylic acids.

The half-esters of alpha,beta-ethylenically unsaturated alpha,beta-dicarboxylic acids are not articles of commerce since they undergo dismutation whereby a mixture of di-ester and free dicarboxylic acid forms within a short time after their preparation. At this time the only commercially feasible method of preparing these compounds in good yields is to react a monohydroxy compound and the anhydride of the dicarboxylic acid. Since fumaric acid by its very nature cannot exist as an anhydride its half-ester cannot be prepared in this manner. This is a serious problem since the products based on the fumaric acid half-esters are by far the most important commercially. Accordingly, an important object of this invention is a commercially feasible method of preparing hydroxy-acryloxy long-chain compounds, wherein the acryloxy group is the residue of a half-ester of fumaric acid.

A further object of this invention is to prepare vicinal acryloxy-hydroxy long-chain aliphatic compounds having a carboxyl group esterified with a monohydroxy compound on the beta atom of the acryloxy group in a process which requires no separation or purification steps. This is of course the ideal way of carrying out any chemical process.

In one aspect, this invention is a process of reacting a half-ester of an alpha,beta-ethylenically unsaturated alpha,beta-dicarboxylic acid with a vicinal epoxy compound having a chain of from 10 to 24 carbon atoms.

In a second aspect, this invention is a process of reacting a half-ester of an alpha,beta-ethylenically unsaturated alpha,beta-dicarboxylic acid with a vicinal epoxy compound having a chain of from 10 to 24 carbon atoms in the presence of an oxirane-ring opening catalyst.

In a third aspect this invention is a process of reacting a mono-hydroxy compound with maleic anhydride to form a half-ester, isomerizing the maleic acid half-ester to a fumaric acid half-ester and then reacting said fumaric acid half-ester with a vicinal epoxy compound.

In somewhat greater detail, the new compounds of this invention can be prepared by heating a half-ester of an alpha,beta-ethylenically unsaturated alpha,beta-dicarboxylic acid with an epoxidized long-chain aliphatic compound alone or in the presence of an oxirane ring opening catalyst. The predominant reaction is the opening of the epoxy ring by the free carboxyl group with the formation of an isomeric mixture of vicinal acryloxy-hydroxy derivative, wherein the beta carbon atom of the acryloxy group is substituted by a carboxylate group. For example:

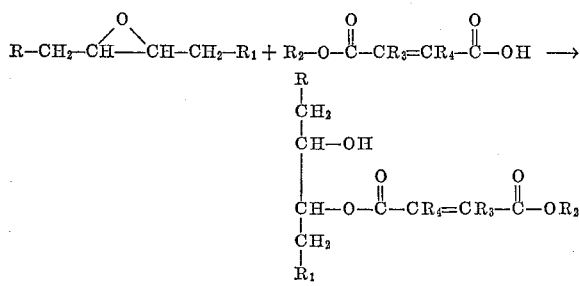

wherein

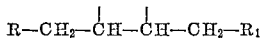

is an aliphatic open-chain of from 10 to 24 carbon atoms; R is hydrogen or a monovalent aliphatic group; $R_1$ is hydrogen or a monovalent aliphatic group; $R_2$ is an alkyl group (including cycloalkyl) of from 1 to 18 carbon atoms or an aryl group of from 6 to 18 carbon atoms; $R_3$ and $R_4$ are independently hydrogen, lower alkyl or halogen.

While the above equation shows the formation of a single compound an isomeric mixture is commonly obtained, since both of the carbon-oxygen bonds in the oxirane ring are opened by the free carboxyl group. In those cases where one mole of half-ester is reacted with one mole of a diepoxy long-chain aliphatic compound, the reaction mixture contains several isomeric epoxy-hydroxy-acryloxy long-chain compounds with the several isomeric doubly hydroxylated and acylated long-chain compounds.

In somewhat greater detail R and $R_1$ can contain various other groups such as hydroxy groups, carboxyl groups, carboxylate groups, carbamyl groups, amino groups, nitrilo groups, carbamato groups, halo groups, etc. The preferred long-chain epoxy compounds of this invention are the readily available epoxidized glyceride oils, such as epoxidized soybean oil, epoxidized corn oil, epoxidized castor oil, epoxidized cottonseed oil, epoxidized hempseed oil, epoxidized safflower oil, epoxidized peanut oil, epoxidized linseed oil, epoxidized olive oil, epoxidized cod oil, epoxidized herring oil, epoxidized menhaden oil, etc. Epoxidized esters of other unsaturated long-chain acids are also advantageous starting materials, such as the methyl ester of 9,10-epoxystearic acid, the 2-ethylhexyl ester of 9,10,12,13-diepoxystearic acid, the phenyl ester of 5,6-epoxycapric acid, epoxidixed tall oil fatty acid esters, etc. The glycerides, and esters generally, are stable and lead to only minor proportions of secondary products during epoxidation and subsequent reactions with half-esters.

On the other hand the presence of groups in the epoxidized long-chain aliphatic compound, which are reactive with the epoxy group at elevated temperatures, such as hydroxyl, amino, carboxyl and amido groups may lead to side reactions during acylation of the epoxy compound with the half-ester. In our experiments we have found that the side-reaction products are compatible with the main reaction products and copolymers derived therefrom.

The various epoxy compounds, which can be utilized in this invention, can be represented by the following formula:

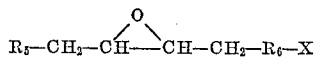

wherein

is an aliphatic chain of from 10 to 24 carbon atoms; $R_5$ is hydrogen or a monovalent aliphatic group; $R_6$ is a divalent aliphatic group; and X is selected from the group consisting of hydrogen, hydroxyl, halo, nitrilo, amino, carbamyl, carbamato, carboxyl, acyloxy, alkoxy, aryloxy and carboxylate.

The following are representative of some of the epoxy compounds which can be used in this invention: 4,5-epoxydecane; 9,10-epoxyoctadecane; 9,10-epoxytetracosane; 8,9-epoxy-1-hydroxydecane; 9,10-epoxy-1-hydroxy-octadecane; 9,10-epoxy-6-hydroxy-tetracosane; 4,5-epoxy-1-chlorodecane; 9,10-epoxy-1-bromooctadecane; 9,10-epoxy-1-chlorotetracosane; 4,5-epoxy-1-nitrilodecane; 9,10-epoxy-1-nitrilooctadecane; 9,10-epoxy-1-nitrilotetracosane; 4,5-epoxy-1-aminodecane; 9,10-epoxy-1-methylaminooctadecane; 9,10-epoxy-1-dioctylaminotetracosane; 4,5-epoxy-1-carbamyldecane; 9,10-epoxy-N-ethyl-1-carbamyloctadecane; 9,10-epoxy-N-dioctyl-1-carbamyltetracosane; 9,10-epoxy-N-dioctyl-1-carbamyltetracosane; 4,5-epoxycapric acid; 9,10-epoxystearic acid; 9,10-epoxyricinoleic acid; 9,10-epoxypentacosic acid; 4,5-epoxy-dectyl-1-acetate; 9,10-epoxystearyl stearate; 9,10-epoxy-1-phenoxy-octadecane, 9,10-epoxy-1-propoxyoctadecane; etc.

When X in the preceding formula is a carboxylate group X can be represented by the formula:

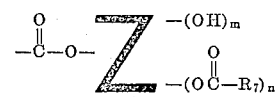

wherein Z is the residue of a hydroxyl compound, $m$ is a number ranging from 0 to 5 and $n$ is a number ranging from 0 to 5, the sum of $m$ and $n+1$ is 1 to 6, the number of hydroxyl groups in the original hydroxyl compound, and each $R_7$ is independently a group selected from the group consisting of hydrogen, monovalent aliphatic groups having from 1 to 24 carbon atoms and monovalent aromatic groups having from 6 to 18 carbon atoms.

The alcohols from which Z in the preceding formula may be derived can contain from 1 to 6 hydroxyl groups and from 1 to 24 carbon atoms. They can be saturated or ethylenically unsaturated. They may be open chain compounds such as n-butanol, glycerol, and sorbitol, or cyclic compounds such as furfuryl alchol, cyclohexanol, and inositol. Among the suitable alcohols for this purpose are the monohydric alcohols ranging from methyl to lignoceryl, including the isomers in which the hydroxyl groups may be primary, secondary, or tertiary. Among the many suitable dihydric alcohols are ethylene glycol, trimethylene glycol, the polymethylene glycols, and the polyethylene glycols. Additional suitable higher polyhydric alcohols are pentaerythritol, arabitol, mannitol, trimethylol propane, trimethylol ethane, etc.

Suitable esters may also be obtained from aromatic hydroxy compounds such as phenol, the cresols, resorcinol, hydroquinone, naphthol, etc.

Included in the present invention are those compounds wherein the ester consists of a polyhydric alcohol only partially acylated with a long-chain carboxylic acid. Examples of this are the products obtained by fully or partially epoxidizing monoglycerides and diglycerides containing suitable unsaturated long-chain acyl groups. Also included in the invention are esters wherein the ester is derived from a polyhydric alcohol, acylated in part by other acids. For example, the glyceryl hydroxy groups in the foregoing monoglycerides and diglycerides may be esterified with acids such as acetic acid, benzoic acid, stearic acid, oleic acid, etc.

The following compounds are representative of the various half-esters, which can be used in this invention: methyl hydrogen maleate; methyl hydrogen fumarate; methyl hydrogen mesaconate; methyl hydrogen citraconate; ethyl hydrogen maleate; ethyl hydrogen fumarate; nate; ethyl hydrogen maleate; ethyl hydrogen fumarate; n-propyl hydrogen maleate; ispropyl hydrogen fumarate; n-butyl hydrogen maleate; tertiary-butyl hydrogen fumarate; isoamyl hydrogen fumarate; 4-methyl-2-pentyl hydrogen fumarate; n-octyl hydrogen maleate; 2-ethylhexyl hydrogen fumarate; decyl hydrogen fumarate; lauryl hydrogen maleate; n-tridecyl hydrogen maleate; stearyl hydrogen fumarate; octyldecyl hydrogen maleate; phenyl hydrogen maleate; p-cresyl hydrogen fumarate; benzyl hydrogen maleate; naphthyl hydrogen fumarate; ethyl hydrogen chlorofumarate; cyclohexyl hydrogen maleate; p-cresyl hydrogen maleate; p-chlorophenyl hydrogen maleate; ethoxyethyl (Cellosolve) hydrogen fumarate; p-decylphenyl hydrogen maleate; etc.

As pointed out earlier the hydroxy-acyloxy compounds based on the fumaric acid half-esters are the most important and the preferred monomers of this invention. This is particularly true of the alkyl hydrogen fumarates having from 2 to 13 carbon atoms in the alkyl group. In general the copolymers of these hydroxy-fumaroxy compounds form harder and tougher coatings and moldings than the copolymers based on the maleic acid half-esters.

The fumaric acid half-esters are prepared by reacting substantially equal molar quantities of maleic anhydride and a monohydric alcohol at a temperature of from 20° C. to about 200° C., isomerizing the maleic acid half-ester to the fumaric acid half-ester using heat and/or an isomerization catalyst.

While various esterification catalysts, such as $BF_3$, p-toluene-sulfonic acid, etc. can be used to catalyze the formation of the maleic acid half-ester, it is preferable to avoid their use since they prevent the orderly formation of half-esters by promoting the reaction of the free acid portion of the half-ester with the monohydroxy compound. Accordingly, the reaction product contains an admixture of diester, monoester, dicarboxylic acid and possibly some unreacted anhydride. Although the presence of the unreactive diester only adds to the cost of the final product, the presence of free anhydride and/or free dicarboxylic acid in the reaction mixture can present a serious problem since these compounds can cross-link epoxidized long-chain materials having more than one epoxy group per molecule into an infusible mass. This problem does not exist where there is only one epoxy group per molecule. Further the fumaric acid is so chemically inert because of its high melting point and insolubility that it is precipitated out as an impurity from the monomer and/or final polymer masses. While the presence of small amounts of free dicarboxylic acid and/or anhydride in the half-ester reaction product can be tolerated when a polyepoxy long-chain compound is reacted with the half-ester, it is usually preferable to keep the proportion to a minimum. Therefore, when an esterification catalyst of the above type is used in the formation of the half-ester, it is usually preferable to use an excess of monohydroxy compound and/or to isolate the half-ester from the anhydride and/or dicarboxylic acid. Of course when the half-ester is prepared directly from the cis or trans dicarboxylic acid or acid halide rather than from the cis anhydride, the aforementioned esterification catalysts are advantageously employed and the esterification reaction product will usually contain an admixture of all of the aforementioned compounds. On the other hand, the initial reaction product of equimolar proportions of anhydride and monohydroxy compound in the absence of a catalyst is the half-ester in almost quantitative yield.

While the monohydroxy compound and maleic anhydride are preferably used in substantially equal molar proportions, it is possible to use either compound in excess. However, when maleic anhydride is used in a molar excess of 25% or more over the monohydroxy compounds (i.e. a ratio of more than 1.0 to 0.), the half-ester should be separated from the reaction mixture before reacting it with a polyepoxy long-chain compound, since the unreacted anhydride can cross-link the polyepoxide to an infusible mass as pointed out previously. On the other hand alcohols can be used in a substantial excess (e.g. 3 or 4 moles to 1 mole anhydride) provided no esterification catalyst is present. When an esterification catalyst is present, the mole ratio of alcohol to anhydride should be no more than 1.5 to 1. Aromatic hydroxy compounds, such as phenol and cresol, should not be used in an excess unless the unreacted hydroxy compound is removed, since these uncombined hydroxy compounds can inhibit the subsequent copolymerization of the monomers of this invention.

The half-esters can be prepared at a temperature of from about 20° C. to 200° C. However, it is usually preferable to carry out this reaction at moderately elevated temperatures (e.g. 80° C.–150° C.) in order to get a rapid reaction without having the half-ester undergo dismutation (i.e. forming diester and dicarboxylic acid). As the reaction temperature increases the possibility of dismutation increases.

While the maleic acid half-ester can be isomerized to the fumaric acid half-ester simply by heating to from about 150° C. to 220° C., it is preferable to carry out the isomerization at lower temperatures using an isomerization catalyst. At about 150° C. or less, the reaction is impractically slow for commercial purposes. At about 180° C. the half-ester isomerizes completely in about four hours. However, at this temperature, there is a tendency for the half-ester to undergo dismutation, even in the absence of an ester-interchange catalyst, and to form free dicarboxylic acid. Here again, when the isomerized product is to be reacted with a polyepoxide, the free dicarboxylic acid must either be separated from the isomerized product or else kept at a tolerable minimum to avoid curing the polyepoxide to an infusible mass or to avoid the presence of precipitated fumaric acid. On the other hand, when an isomerization catalyst is used, the half-ester of maleic acid can be rapidly converted to the half-ester of fumaric acid at a temperature of from 50° C. to 150° C. without any significant dismutation. At temperatures as low as 80 to 110° C. the isomerization is complete in from about 5 to 60 minutes.

The following compounds can be used as isomerization catalysts: phosphorus oxychloride, phosphorus trichloride, thionyl chloride, phosphorus oxybromide, phosphorus oxyiodide, phosphorus oxyfluoride, phosphorus tribromide, phosphorus triiodide, phosphorus trifluoride, 2-ethylhexyl phosphoryl dichloride, di-(2-ethylhexyl) phosphoryl monochloride, phosphorus thiobromide, phosphorus thiochloride, thionyl bromide, thionyl fluoride, hexadecane sulfone chloride, toluene sulfone chloride, chlorosulfonic acid, sulfur monobromide, sulfur monochloride, sulfur dichloride, sulfuryl chloride, iodine, bromine, tertiary butyl hypochlorite, aluminum chloride, diethylamine, sulfur dioxide, zinc hydrosulfite, etc. Thionyl chloride, phosphorus trichloride and phosphorus oxychloride are the preferred catalysts because of their availability and efficiency. These catalysts can be used in an amount equal to from 0.0001 mole to 0.1 mole per mole per mole of half-ester. Larger concentrations only increase the cost of the product.

More specifically, the long-chain vicinal acyloxy-hydroxy compounds of this invention can be prepared by reacting a half-ester of an alpha,beta-ethylenically unsaturated alpha,beta-dicarboxylic acid with an epoxidized long-chain aliphatic compound at a temperature of from about 80° C. to 200° C. Temperatures as low as 20° C. will yield useful products, if the reactants are permitted to stand from 3 to 6 months; this is obviously impractical. Furthermore, the longer the half-ester is allowed to stand in an unreacted state the more chance there is for dismutation. At temperatures of 80° C. to 200° C., the reaction is sufficiently rapid to avoid formation of free acid in any important amount. In this temperature range, the instant reaction goes readily in from 4 to 8 hours on a commercial scale without the presence of a catalyst, but it is generally preferable to use an oxirane-ring opening catalyst in order to increase the yield and cut down the total reaction time still further to from ¼ hour to 2 hours.

The following compounds are representative of the oxirane-ring opening catalysts, which can be used in an amount equal to 0.0001 to 0.1 mole per equivalent of oxirane in the epoxy compound: zinc dust, zinc hydrosulfite, basic zinc sulfoxylate formaldehyde

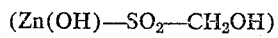

sodium sulfoxylate formaldehyde

zinc acetate, chromium acetate, zinc bisulfite, magnesium powder, cobalt powder, cadmium acetate, zinc iodide, antimony trichloride, tetraisopropyl titanate, isopropoxy titanium stearate, zinc fluoride, zinc phenol sulfonate, sodium carbonate, aluminum isopropoxide, tertiary butyl titanate, magnesium iodide, tetramethyl ammonium chloride, etc. The preferred catalysts are zinc dust, zinc hydrosulfite, basic zinc sulfoxylate formaldehyde and sodium sulfoxylate formaldehyde. The preferred catalysts are very efficient, give colorless products, and do not initiate the copolymerization of the half-ester-epoxy reaction product even when stored in admixture with a reactive monomer such as styrene. The various other catalysts are deficient in one or more of the above. For example tetramethylammonium chloride, which is an efficient oxirane-ring catalyst, yields a brownish reaction product. Further, the tetramethyl ammonium chloride catalyzes the reaction between styrene and the half-ester-epoxy reaction product when standing at room temperature.

Although the formation of the acyloxy-hydroxy compounds of this invention can be carried out in the presence of inert solvents and diluents, there is no practical advantage in using same. Reactive hydrocarbon diluents, such as styrene, should be avoided in the oxirane-opening reaction unless a polymerization inhibitor is present in the reaction mixture.

The half-ester and the epoxy compound can be present in the reaction mixture in virtually any proportion. Usually the half-ester will be present in a ratio of from about 0.1 to 1.5 equivalents per equivalent of oxirane in the reaction mixture. However, the most advantageous proportion is about 1:1 when an epoxidized glyceride oil is used. As this ratio of equivalents of half-ester to equivalents of oxirane in an epoxidized glyceride oil increases, the copolymerizates of these materials with vinylidene compounds are more rigid and stronger. At a 1:1 ratio the products have an excellent balance of properties, particularly good flexibility and high tensile strength.

When desired, it is possible to isomerize the maleate groups to fumarate after the reaction of the maleic acid half-ester with the epoxidized long-chain compound. In these cases heat and/or isomerization catalysts may be employed in the same maner as when the half-ester is isomerized with the exception that the temperature used need only be less than the decomposition temperature of the reactants. However, it is usually preferable to isomerize before reacting the half-ester with the long-chain epoxy compound, since for some unexplained reasons these products form copolymerization products with vinylidene compounds having a higher tensile strength than corresponding copolymerization products of monomers isomerized after reaction with the epoxy compound.

As would be expected it is possible to use one or more half-esters and/or epoxy compounds to modify the various characteristics of the monomers. It is also possible to modify the monomer by only partially isomerizing the maleate groups either before or after reaction with the long-chain epoxy compound.

In summation the processes of this invention offer the advantage that, by starting with readily available materials, valuable copolymerizable monomers can be prepared in high yields in a series of reactions requiring no isolation or purification at any point. For example, in the most complex situation, the fumarate derivatives can be prepared in three steps: (1) reacting maleic anhydride with a monohydroxy compound to form a half-ester; (2) isomerizing the maleic acid half-ester to fumaric acid half-ester; (3) reacting the fumaric acid half-ester with a long-chain epoxy compound. The final product can be stored or shipped as is, without any further treatment or purification, or compounded with a polymerizable monomer and polymerization inhibitor prior to storage or shipment.

The physical and chemical characteristics of the new compounds contemplated by this invention, and especially those of the copolymers and resins derived therefrom, can be altered substantially by choice of the starting epoxidized compound, by choice of the half-ester, and by the degree or extent of acylation with the half-ester. Furthermore, these monomers can be copolymerized with a variety of vinyl monomers, such as methyl methacrylate, ethyl acrylate, butyl methacrylate, stearyl acrylate, acrylic acid, methacrylic acid, styrene, methylstyrene, allyl alcohol, vinyl acetate, vinyl stearate, acrylonitrile, vinyl chloride, divinylbenzene, butadiene, and the like, or unsaturated compounds such as maleic acid, crotonic acid, cinnamic acid, dipentene, myrcene, and the like. The resulting copolymers range from viscous liquids through soft gels to tough rubbery products and hard resins. The copolymers are prepared under typical free-radical polymerization conditions, using, for example, a peroxidic catalyst.

These new compounds may be copolymerized through their ethylenic unsaturation with vinyl monomers. These new compounds which contain residual epoxy groups may be cross-linked through these groups to form useful condensation products. The copolymers and condensation products are useful broadly as protective coatings, textile and paper additives and sizing agents, laminating resins, potting resins, stabilizer-plasticizers, and adhesives. They are also useful in the manufacture of cast and extruded objects.

The novel compounds containing epoxy groups are also useful as stabilizer-plasticizers and as intermediates in the preparation of internally stabilized and plasticized resins. To function as a stabilizer-plasticizer for polyvinyl chloride, for example, the ester must possess an appreciable content of oxirane oxygen, be compatible with the resin and have a sufficiently low vapor pressure. Examples of esters meeting these requirements are those obtained by reacting a fully epoxidized vegetable oil, such as soybean oil, with less than one equivalent of half-ester per equivalent of oxirane oxygen.

Internally stabilized and plasticized resins may be obtained from the new compounds containing epoxy groups by copolymerizing them with other vinyl monomers. Such resinous products can be prepared either from the new compounds of medium molecular weight as, for example, those derived from vegetable oils, or from those of lower molecular weight such as the fully epoxidized n-butyl ester of linoleic acid.

Residual unreacted half-ester or diester derived therefrom may be present in the new products of this invention. If present during subsequent vinyl polymerization, both readily copolymerize with polymerizable vinyl material to form homogeneous products. If desired, however, the residual half-ester or diester may be removed by vacuum distillation, solvent extraction, by contact with an acid-adsorbing resin, etc.

It will be apparent from the foregoing description that the new compounds of the present invention may have one or more acyloxy groups and one or more of the characteristic long-chain alkyl groups. The invention contemplates (1) the separate molecular species of the defined acylated long-chain aliphatic compounds, (2) mixtures of such molecular species, and (3) the separate or mixed species together with compatible unreacted starting materials and/or compatible side-reaction products thereof.

While the instant specification is directed primarily to the preparation of vicinal acryloxy-hydroxy long-chain aliphatic compounds having a carboxyl group esterified with a monohydroxy compound on the beta carbon atom of the acryloxy group, our three-step process of preparing unsymmetrical fumarate esters from maleic anhydride, a monohydroxy compound and a long-chain epoxy compound can be used with any vicinal epoxy compound. For example, after the maleic anhydride has been reacted with a monohydroxy compound, and then isomerized, the reaction product can be reacted with an epoxy such as ethylene oxide, 1,2-propylene oxide, styrene oxide, epichlorohydrin, the diglycidyl ether of bisphenol A, etc. The only difference in the reaction is that the 1,2-epoxy compounds are more reactive than the long-chain internal epoxy compounds and can be used at room temperature with little difficulty. The resulting compounds readily copolymerize with various vinylidene compounds, such as those mentioned before, to form useful products.

The following examples are merely descriptive and should not be construed as limiting the scope of the invention.

EXAMPLE I

One and one-half moles of maleic anhydride (147 grams) was weighed into a flask equipped with a stirrer, thermometer, condenser and dropping funnel, and then heated to 105° C. One and one-half moles of methanol (48 grams) was added slowly from the dropping funnel while maintaining the temperature of the reaction mixture at 90–100° C. When sufficient heat was being generated by the reaction, the external heating was discontinued and the temperature rose to 135–140° C. The reaction mixture was allowed to cool to 100° C. and maintained at this temperature for 1 hour. An analytical sample of the reaction product had an acid value of 7.58 meq./g. (theoretical 7.70 meq./g.) and a saponification value of 15.34 meq./g. (theoretical 15.40 meq./g.). Infrared indicated that an essentially pure half-ester of maleic acid had been prepared.

Seventy-three hundredths of a gram of thionyl chloride (0.38% by weight of the half-ester) was added to the reaction vessel and the temperature was maintained at between 90 and 100° C. for twenty minutes. The measured acid value was 8.03 meq./g. and the saponification value was now 15.38 meq./g. Infrared spectrophotometric analysis showed that there had been 95° conversion to the trans isomer, i.e. to methyl fumarate.

Three hundred and seventy-five grams of epoxidized soybean oil (having 6.4% oxirane by weight and equal to 1.5 equivalents) was added to the half-ester reaction product in the same vessel, followed by 0.35 gram of basic zinc sulfoxalate formaldehyde. The reaction mixture was heated to 160° C. and maintained there until the oxirane value of the reaction mixture (by HBr-acetic acid titration) was less than 0.01 meq./g. This took approximately 40 minutes. The monomer, which was a mixture of solid and liquid, readily copolymerized with styrene in the presence of a peroxidic catalyst to form a hard, rigid material.

EXAMPLE II

One mole of maleic anhydride (98 grams) was weighed into a flask equipped with a stirrer, thermometer, condenser and dropping funnel and then heated to 110° C. One mole of 2-ethylhexanol (130 grams) was added slowly (approximately 20 minutes) from the dropping funnel while maintaining the reaction mixture at 110° C. The temperature was maintained at 110° C. for forty minutes after the addition of 2-ethylhexanol was complete. Sixty-eight hundredths of a gram of PCl$_3$ (0.005 mole) was added to the reaction mixture, while maintaining the reactants at 110° C. for 12 minutes. Immediately thereafter, two hundred and fifty grams of epoxidized soybean oil containing 6.4% by weight oxirane (1 equivalent) and 0.23 gram of basic zinc sulfoxalate formaldehyde (0.0013 mole) were added to the half-ester reaction vessel. The reactants were maintained at 135° C. until the oxirane value (by HBr-acetic acid titration) was less than 0.10 meq./g. (40 minutes). The product after cooling was a viscous clear pale yellow liquid which had:

| | |
|---|---|
| Acidity _____meq./per g__ | 0.90 |
| Saponification _____meq./per g__ | 5.92 |
| Hydroxyl _____meq./per g__ | 1.50 |
| Trans isomer _____percent__ | 98 |
| Refractive index, $n_D^{45}$ _____ | 1.4710 |
| Viscosity at 25° C. _____cp.__ | 28,500 |

Four hundred grams of the product was copolymerized with 30% by weight styrene (120 grams) using a peroxide catalyst. The copolymer was quite flexible. A comparison of this example with the results of the next four examples is presented in Table I.

In the preceding example, the maleic acid half-ester is isomerized immediately after its preparation and the fumaric acid half-ester is reacted with the long-chain epoxy compound immediately after the isomerization step. This is the preferred method of carrying out this invention, since the half-esters start to dismutate shortly after their formation. While only a few percent of dicarboxylic acid is formed if the half-ester is stored at room temperature for a week, the presence of varying amounts of dicarboxylic acid in the half-ester reaction mixture affects the reproducibility of the physical properties of the copolymerizable monomers and copolymers thereof. The presence of fumaric acid (M.P. 283°) can be detected visually since fumaric acid is insoluble in liquid alkyl hydrogen fumarates at moderately elevated temperatures. This insolubility permits a rapid evaluation of whether the fumarate half-esters have sufficient purity or whether the fumaric acid should be filtered off from the half-ester. Accordingly, while it is relatively easy to remove fumaric acid from fumaric acid half-esters, even after prolonged storage we prefer to avoid all purification and isolation steps as pointed out earlier. Therefore, by "immediately" we mean that the fumarate half-ester is prepared and then reacted with the epoxy compound prior to the dismutation of a significant amount of fumaric acid half-ester. However, the smaller the total elapsed time required by isomerization step and reaction with the epoxy compound the more reproducible the final products. A total elapsed time of from 10 minutes to 1 hour for these two steps is considered desirable.

EXAMPLE III

Example II was repeated except that 1.54 moles of 2-ethylhexyl hydrogen fumarate was prepared and then reacted with 1 equivalent of epoxidized soybean oil at 135° C. for 45 minutes.

EXAMPLE IV

Example II was repeated except that 1.25 moles of 2-ethylhexyl hydrogen fumarate was prepared and then reacted with 1 equivalent of epoxidized soybean oil at 135° C. for 30 minutes.

EXAMPLE V

Example II was repeated except that 0.75 mole of 2-ethylhexyl hydrogen fumarate was prepared and then reacted with 1 equivalent of epoxidized soybean oil at 135° C. for 90 minutes.

EXAMPLE VI

This example illustrates the isomerization of the reaction product of 2-ethylhexyl hydrogen maleate and epoxidized soybean oil. One and one-quarter mole of maleic anhydride (122.5 grams) was weighed into a flask equipped with a stirrer, thermometer, condenser and dropping funnel and then heated to 110° C. One and one-quarter moles of 2-ethylhexanol (162.5 grams) was added slowly (approximately 25 minutes) from the dropping funnel while maintaining the reaction mixture at 110° C., the temperature was kept at that value for 40 minutes after the addition was complete. Two hundred and fifty grams of epoxidized soybean oil containing 6.4% by weight oxirane (1 equivalent) and 0.23 gram of basic zinc sulfoxalate formaldehyde (0.0013 mole) were added to the half-ester reaction vessel. After the reactants had been maintained at 135° C. for 30 minutes the temperature of the reactants was adjusted to 110° C. Sixty-eight hundredths of a gram of $PCl_3$ (0.005 mole) was added to the reaction mixture, while maintaining the reactants at 110° C. for 12 minutes. The product was then cooled to 60° C.

Four hundred grams of the product was copolymerized with 30% by weight styrene (120 grams) using a peroxide catalyst. The product was flexible.

*Table I*

| Sample | Moles of Half-Ester per Equivalent of Epoxy | Oxirane Oxygen in meq./g. | Percent Trans Isomer[1] | Total Sapon in Meq. | | Tensile Strength of Copolymer with 30% by Weight Styrene in p.s.i. |
|---|---|---|---|---|---|---|
| | | | | Analytical | Theory | |
| Example II | 1.0 | 0.01 | 100 | 2,892 | 2,852 | 930 |
| Example III | 1.54 | 0.01 | 98 | 3,160 | 3,150 | 2,000 |
| Example IV | 1.25 | 0.02 | 92 | 2,710 | 2,690 | 1,050 |
| Example V | 0.75 | 0.05 | 100 | 2,280 | 2,340 | 925 |
| Example VI | 1.25 | 0.02 | 92 | 2,660 | 2,690 | 745 |

[1] Percent of the alpha, beta-ethylenically unsaturated dicarboxylic acid which is fumarate.

A comparison of Examples II, III, IV and V indicates that the tensile strength of the copolymer increases as the radio of half-ester to equivalents of epoxy increases. However, the product becomes more brittle too. A comparison of Examples IV and VI indicates that copolymers based on styrene are stronger if the maleate is isomerized to the fumarate structure prior to reaction with the epoxidized material rather than after the reaction with epoxidized material.

EXAMPLE VII

One mole of maleic anhydride (98 grams) was weighed into a flask equipped with a stirrer, thermometer, condenser and dropping funnel, and then heated to 110° C. One mole of 4-methyl-pentanol-2 (102 grams) was added slowly from the dropping funnel (35 minutes) while maintaining the reaction mixture at 110° C. The temperature was maintained at 110° C. for 40 minutes after the addition of 4-methylpentanol-2 was complete. One and fourteen hundredths of a gram of $PCl_3$ was added to the reaction mixture, over a ten-minute period while maintaining the reactants at 110° C. Two hundred and fifty grams of epoxidized soybean oil containing 6.4% by weight oxirane (1 equivalent) and 0.23 gram of basic zinc sulfoxalate formaldehyde were added to the half-ester reaction vessel. The reactants were maintained at 135° C. for 40 minutes. The product was then cooled to 60° C. The product had 0.08 meq./g. of oxirane oxygen and 100% trans isomer. A copolymer with 30% by weight styrene was flexible and had a tensile strength of 1730 p.s.i.

EXAMPLE VIII

Example II was repeated except that 1 mole of decyl alcohol was used in place of 2-ethylhexanol. The product had 0.06 meq./g. of oxirane oxygen and 100% trans isomer. A copolymer with 30% by weight styrene had a tensile strength of 1290 p.s.i.

EXAMPLE IX

Example II was repeated except that 0.85 equivalent of monotridecyl hydrogen fumarate was prepared and then reacted with 1 equivalent of epoxidized soybean oil at 135° C. for 60 minutes. The product had 0.12 meq./g. of oxirane oxygen and 100% trans isomer. A copolymer with 30% by weight styrene had a tensile strength of 805 p.s.i.

EXAMPLE X

Example I was repeated except that 1.5 moles of isopropyl alcohol was used in place of methanol and the maleic acid half-ester was isomerized at between 60 and 80° C. over a period of 30 minutes using 2 grams of thionyl chloride as isomerization catalyst. The product had 0.01 meq./g. of oxirane oxygen and 98% trans isomer. A copolymer with 33% by weight styrene was clear, hard and rigid.

EXAMPLE XI

One and one-half moles of methyl hydrogen maleate was prepared by the method of Example I. The half-ester was then reacted with 375 grams of epoxidized soybean oil at 150° C. for 30 minutes in the presence of 0.35 gram of basic zinc sulfoxalate formaldehyde. The product had only a trace of trans isomer. Half of the product was copolymerized with 33% by weight styrene to form a clear, hard, flexible solid. The remainder of the half-ester-epoxidized oil reaction product was isomerized at 180° C. for 40 minutes in the presence of 2 grams of $PCl_3$ as catalyst. This product, which had 77% trans isomer, was copolymerized with 33% by weight styrene to form a hard, rigid, clear solid.

EXAMPLE XII

This example illustrated the preparation of a maleate derivative, where no catalyst is employed to open the oxirane ring of the long chain epoxy compound. After 0.2 gram of sodium was dissolved in 4 ml. of ethanol, 16 grams of maleic anhydride was dissolved in the admixture. Nineteen grams of epoxidized soybean oil was added to the reaction mixture and the mixture was heated to between 125 to 140° C. for 1 hour. The clear product of this reaction readily copolymerized with styrene.

EXAMPLE XIII

Example XI was repeated except that the half-ester was reacted at 190° C. for one-half hour with the epoxidized soybean oil. The product of this reaction also readily copolymerized with styrene.

EXAMPLE XIV

Two-tenths of a gram of sodium was added to 10 grams of cyclohexanol. After the composition was heated to 110° C., 9.8 grams of maleic anhydride was added. After 30 minutes at this temperature, 24.6 grams of epoxidized soybean oil was added and the reaction mixture was maintained at 120° C. for 1 hour. The clear product of this reaction readily copolymerized with styrene.

EXAMPLE XV

A product copolymerizable with styrene was prepared by the method of Example II except that 18.2 grams of phenyl hydrogen fumarate was reacted for one hour at 140–150° C. in the absence of an oxirane ring opening catalyst with 23.8 grams of epoxide soybean oil.

EXAMPLE XVI

A product copolymerizable with styrene was prepared by the method of Example II except that 14.4 grams of ethyl hydrogen fumarate was reacted for one hour at 140–150° C. with 31.2 grams of methyl 9,10-epoxystearate in the absence of an oxirane ring opening catalyst.

EXAMPLE XVII

A product copolymerizable with styrene is prepared by the method of Example II except that 390 grams of epoxidized soy fatty acid 2-ethylhexyl esters (1 equivalent of oxirane oxygen) is used in place of the epoxidized soybean oil.

EXAMPLE XVIII

A product copolymerizable with styrene is prepared by the method of Example II except that 364 grams of epoxidized tall oil fatty acid isooctyl ester (1 equivalent of oxirane oxygen) is used in place of the epoxidized soybean oil.

EXAMPLE XIX

A product copolymerizable with styrene is prepared by the method of Example II except that 370 grams of epoxidized soybean oil fatty alcohol (1 equivalent of oxirane oxygen) is used in place of the epoxidized soybean oil.

EXAMPLE XX

A product copolymerizable with styrene is prepared by the method of Example II except that 148 grams of the diglycidyl ether of bisphenol A (1 equivalent of oxirane oxygen) is used in place of the epoxidized soybean oil and the epoxy-half-ester reaction is carried out at 30° C.

The vicinal acryloxy-hydroxy compounds of this invention can be copolymerized at a temperature of from about 0° C. to 250° C. with any of the aforementioned vinylidene compounds. The vicinal acryloxy-hydroxy compound can comprise from about 2 to 95 weight percent of the polymerizable monomers. The polymerization can be carried out by reacting the copolymerizable vicinal acryloxy-hydroxy long chain compound and a vinylidene monomer in the presence of a free radical catalyst in bulk, solution, suspension or emulsion. Typical free radical catalysts, which include the peroxidic catalysts, such as hydrogen peroxide, acetyl peroxide, benzoyl peroxide, tertiary butyl hydroperoxide, potassium persulfate, etc., can be used in a concentration of from 0.1% to 10% by weight of the reactants.

Since many embodiments of this invention may be made and since many changes may be made in the embodiments described, the foregoing is to be interpreted as illustrative only and our invention is defined by the claims appended hereafter.

We claim:

1. The process of preparing a copolymerizable monomer, which comprises heating substantially equal molar quantities of maleic anhydride and a saturated alcohol having the structure $R_2OH$, wherein $R_2$ is an alkyl group of from 1 to 18 carbon atoms, at a temperature of from about 80° C. to 150° C. to form a maleic acid half-ester, immediately isomerizing said maleic acid half-ester at a temperature of from about 80° C. to 150° C. in the presence of an isomerization catalyst, to convert said maleic acid half-ester to a fumaric acid half-ester, and then immediately reacting said fumaric acid half-ester with oxirane segment of epoxidized soybean oil at a temperature of from about 80° C. to 200° C. in the presence of an oxirane ring opening catalyst, whereby no polymerization of an ethylenically unsaturated group takes place under the reaction conditions.

2. The process of preparing a copolymerizable monomer, which comprises reacting substantially equal molar quantities of maleic anhydride and a monohydroxy organic compound having the structure $R_2OH$, wherein $R_2$ is a group selected from the class consisting of an alkyl group having from 1 to 18 carbon atoms and an aryl group having from 6 to 18 carbon atoms at a temperature of from about 20° C. to 200° C. to form a maleic acid half-ester, isomerizing said maleic acid half-ester at a temperature of from about 50° C. to 200° C. in the presence of an isomerization catalyst to form a fumaric acid half-ester, and then reacting said fumaric acid half-ester with oxirane segment of an epoxidized glyceride oil at a temperature of from about 20° C. to 200° C. in the presence of an oxirane ring opening catalyst, whereby no polymerization of an ethylenically unsaturated group takes place under the reaction conditions.

3. The process of preparing a copolymerizable monomer which comprises reacting maleic anhydride and a monohydroxy organic compound having the structure $R_2OH$, wherein $R_2$ is a group selected from the class consisting of an alkyl group having from 1 to 18 carbon atoms and an aryl group having from 6 to 18 carbon atoms to form a maleic acid half-ester, isomerizing said maleic acid half-ester to form a fumaric acid half-ester and then reacting said fumaric acid half-ester with oxirane segment of a vicinal epoxy compound, whereby no polymerization of an ethylenically unsaturated group takes place under the reaction conditions.

4. The process of preparing a copolymerizable monomer, which comprises reacting a half-ester of an alpha, beta-ethylenically unsaturated alpha,beta-dicarboxylic acid and a monohydroxy organic compound having the structure $R_2OH$, wherein $R_2$ is a group selected from the class consisting of an alkyl group having from 1 to 18 carbon atoms and an aryl group having from 6 to 18 carbon atoms, with oxirane segment of a long chain fatty compound having an aliphatic fatty chain of from 10 to 24 carbon atoms, said aliphatic fatty chain containing an internal oxirane segment, whereby no polymerization of an ethylenically unsaturated group takes place under the reaction conditions.

5. The process of claim 4, wherein the reaction is carried out at a temperature of from about 80° C. to 200° C. in the presence of an oxirane ring opening catalyst.

6. The process of claim 4, wherein the half-ester is a half-ester of fumaric acid.

7. The process of claim 4, wherein the half-ester is a half-ester of maleic acid.

8. The process of claim 7, wherein the maleic acid half-ester-epoxy-compound reaction product is isomerized to a fumaric acid half-ester-epoxy reaction product at a temperature in excess of 50° C.

9. The process of preparing a copolymerizable monomer, which comprises reacting an alkyl half-ester of fumaric acid having from 1 to 18 carbon atoms in the alkyl group with oxirane segment of an epoxidized glyceride oil at a temperature of from about 80° C. to 200° C. in the presence of an oxirane ring opening catalyst whereby no polymerization of an ethylenically unsaturated group takes place under the reaction conditions.

10. The process of preparing a copolymerizable monomer, which comprises reacting a half-ester of an ethylenically unsaturated dicarboxylic acid having the structure

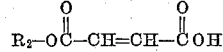

$$R_2-O\overset{O}{\overset{\|}{C}}-CH=CH-\overset{O}{\overset{\|}{C}}OH$$

wherein $R_2$ is a group selected from the class consisting of an alkyl group having from 1 to 18 carbon atoms and an aryl group having from 6 to 18 carbon atoms, with oxirane segment of a long chain fatty acid ester having an esterified aliphatic fatty acid chain of from 10 to 24 carbon atoms wherein said aliphatic fatty acid chain contains an internal oxirane segment, whereby no polymerization of an ethylencally unsaturated group takes place under the reaction conditions.

11. The process of claim 10, wherein the epoxy compound is an epoxidized glyceride oil.

12. A copolymerizable glyceride oil reaction product having an aliphatic chain of from 10 to 24 carbon atoms, said aliphatic chain having vicinal fumaryloxy and hydroxy groups, wherein the free carboxyl group of the fumaryloxy group is esterified with a saturated alcohol having the structure $R_2OH$, wherein $R_2$ is an alkyl group of from 1 to 18 carbon atoms.

13. The copolymerizable glyceride oil of claim 12, wherein the alcohol is 2-ethylhexanol.

14. The copolymerizable glyceride oil of claim 12, wherein the alcohol is decanol.

15. The copolymerizable glyceride oil of claim 12, wherein the alcohol is isopropanol.

16. The copolymerizable glyceride oil of claim 12, wherein the alcohol is methylpentanol.

17. The copolymerizable glyceride oil of claim 12, wherein the alcohol is propanol.

18. A copolymerizable long chain fatty acid ester having an esterified aliphatic fatty acid chain of from 10 to 24 carbon atoms wherein said aliphatic fatty acid chain contains internal vicinal acryloxy and hydroxy substituents, and said acryloxy substituent has attached to the beta carbon atom thereof a $$-\overset{O}{\underset{\|}{C}}OR_2$$

group wherein $R_2$ is selected from the class consisting of an alkyl group having from 1 to 18 carbon atoms and an aryl group having from 6 to 18 carbon atoms.

19. A copolymerizable long chain fatty compound having an aliphatic chain of from 10 to 24 carbon atoms wherein said aliphatic chain contains internal vicinal acryloxy and hydroxy substituents, and said acryloxy substituent has attached to the beta carbon atom thereof a $$-\overset{O}{\underset{\|}{C}}OR_2$$

group wherein $R_2$ is selected from the class consisting of an alkyl group having from 1 to 18 carbon atoms and an aryl group having from 6 to 18 carbon atoms.

20. The process of preparing a copolymerizable monomer, which comprises reacting maleic anhydride and a monohydroxy organic compound having the structure $R_2OH$, wherein $R_2$ is a group selected from the class consisting of an alkyl group having from 1 to 18 carbon atoms and an aryl group having from 6 to 18 carbon atoms, to form a maleic acid half-ester, isomerizing said maleic acid half-ester in the presence of an isomerization catalyst to form a fumaric acid half-ester and then reacting said fumaric acid half-ester with oxirane segment of a long chain fatty compound having an aliphatic fatty chain of from 10 to 24 carbon atoms, said aliphatic fatty chain containing an internal oxirane segment, whereby no polymerization of an ethylenically unsaturated group takes place under the reaction conditions.

21. The process of preparing a copolymerizable monomer, which comprises reacting maleic anhydride and a monohydroxy organic compound having the structure $R_2OH$, wherein $R_2$ is a group selected from the class consisting of an alkyl group having from 1 to 18 carbon atoms and an aryl group having from 6 to 18 carbon atoms, to form a maleic acid half-ester, isomerizing said maleic acid half-ester at a temperature of from about 150° C. to 220° C. to form a fumaric acid half-ester and then reacting said fumaric acid half-ester with oxirane segment of a long chain fatty compound having an aliphatic fatty chain of from 10 to 24 carbon atoms, said aliphatic fatty chain containing an internal oxirane segment, whereby no polymerization of an ethylenically unsaturated group takes place under the reaction conditions.

22. A copolymerizable long chain fatty compound having an aliphatic chain of from 10 to 24 carbon atoms, said aliphatic chain having internal vicinal fumaryloxy and hydroxy substituents, wherein the free carboxyl group of the fumaryloxy group is esterified with a saturated alcohol having the structure $R_2OH$, wherein $R_2$ is an alkyl group of 1 to 18 carbon atoms.

References Cited in the file of this patent

UNITED STATES PATENTS

| | | |
|---|---|---|
| 2,386,250 | McNally et al. | Oct. 9, 1945 |
| 2,386,446 | De Groote et al. | Oct. 9, 1945 |
| 2,886,472 | Condo et al. | May 12, 1959 |
| 2,949,441 | Newly | Aug. 6, 1960 |
| 2,966,479 | Fischer | Dec. 27, 1960 |
| 2,934,516 | Hicks | Apr. 26, 1963 |

FOREIGN PATENTS

| | | |
|---|---|---|
| 120,697 | Australia | Dec. 20, 1945 |

UNITED STATES PATENT OFFICE
CERTIFICATE OF CORRECTION

Patent No. 3,190,899                                June 22, 1965

Henry M. Walton et al.

It is hereby certified that error appears in the above numbered patent requiring correction and that the said Letters Patent should read as corrected below.

In the grant, line 1, and in the heading to the printed specification, line 7, for "Henry W. Walton", each occurrence, read -- Henry M. Walton --; column 3, line 40, for "soybeam" read -- soybean --; column 4, line 68, strike out "nate; ethyl hydrogen maleate; ethyl hydrogen fumarate;"; column 5, line 65, for "1.0 to 0.)" read -- 1.0 to 0.8) --; column 6, line 52, strike out "per mole"; column 7, line 40, for "this" read -- the --; column 11, line 33, for "radio" read -- ratio --; column 12, line 60, for "epoxide" read -- epoxidized --.

Signed and sealed this 22nd day of March 1966.

(SEAL)
Attest:

ERNEST W. SWIDER
Attesting Officer

EDWARD J. BRENNER
Commissioner of Patents